United States Patent Office 3,035,366
Patented May 22, 1962

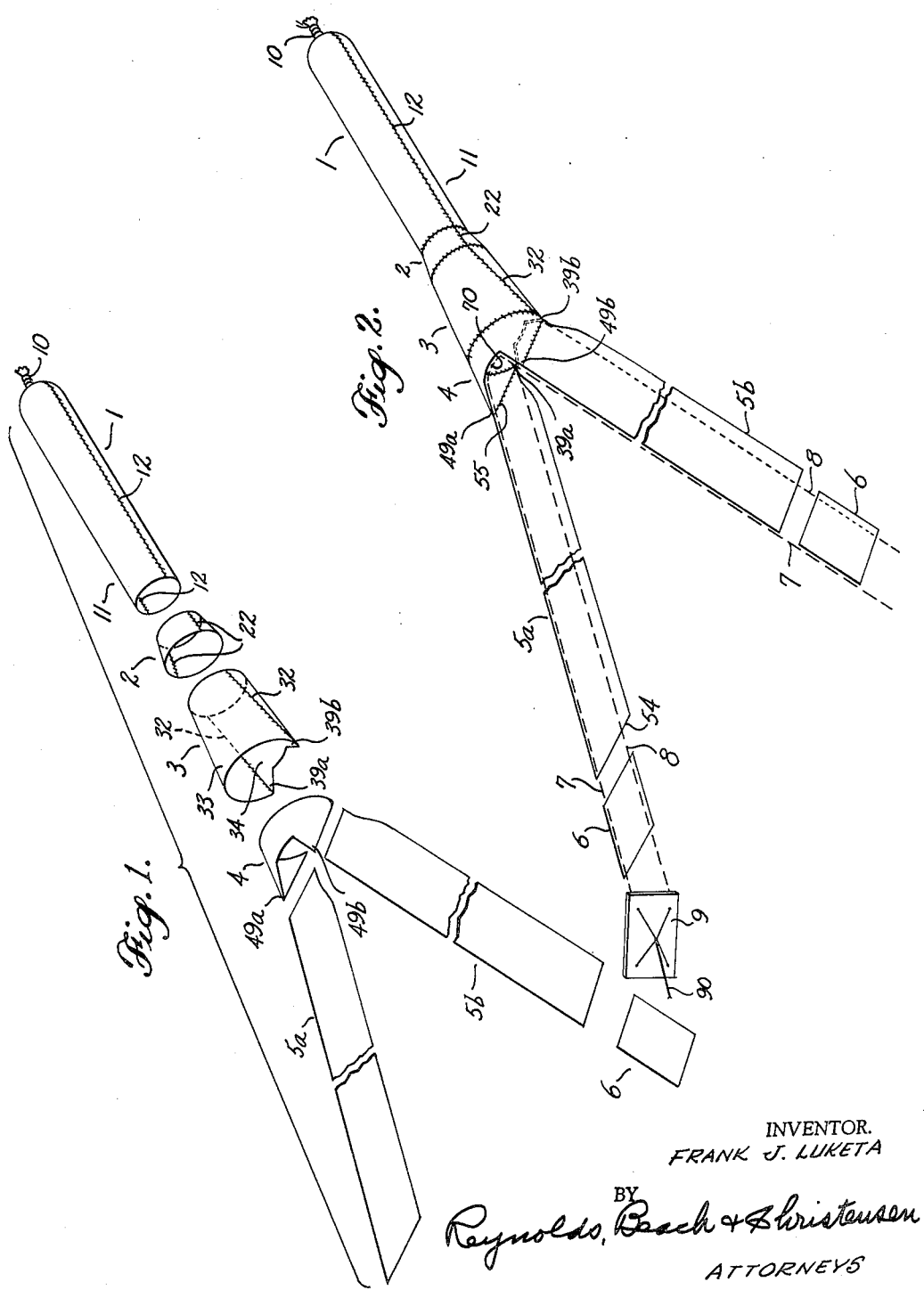

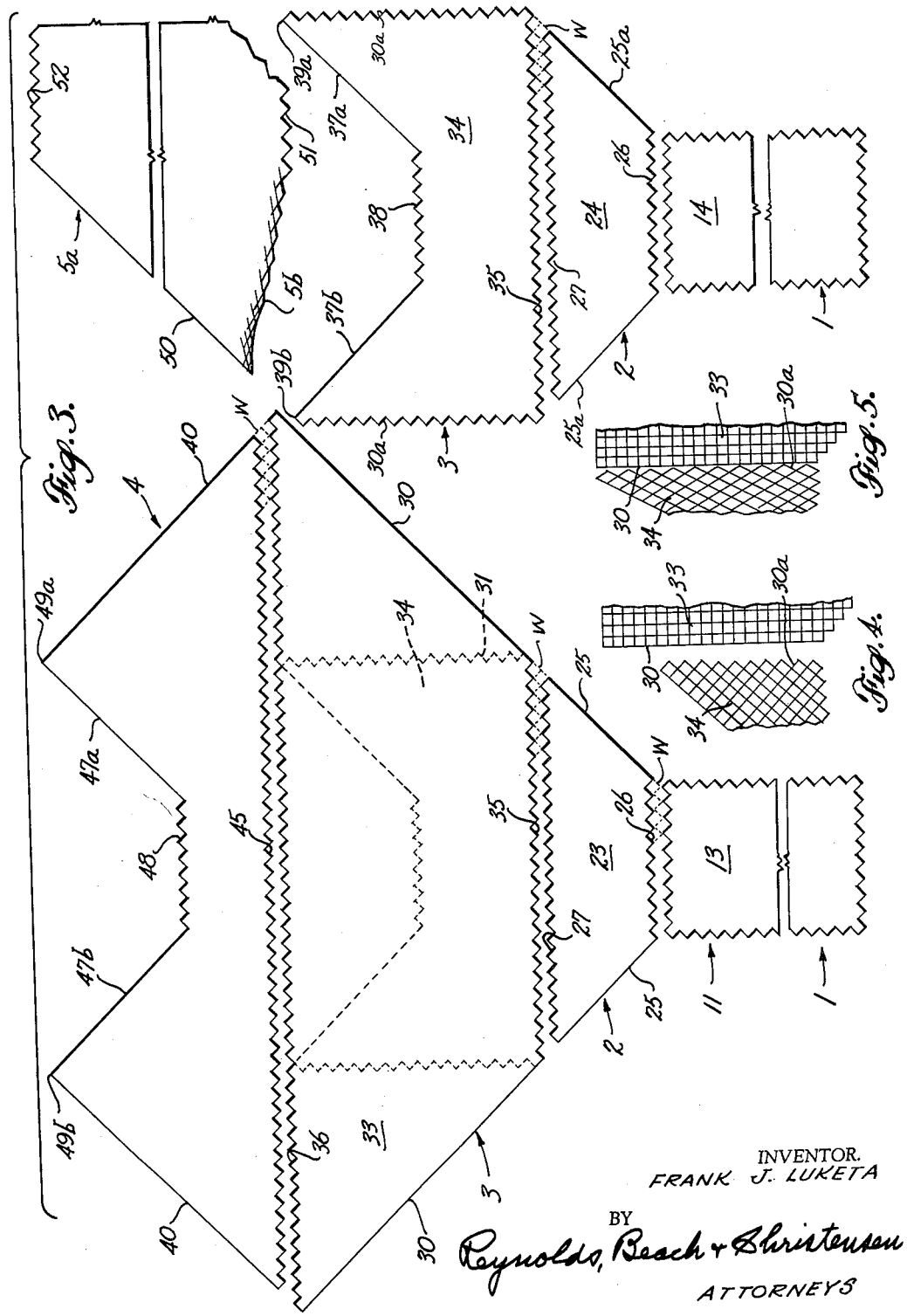

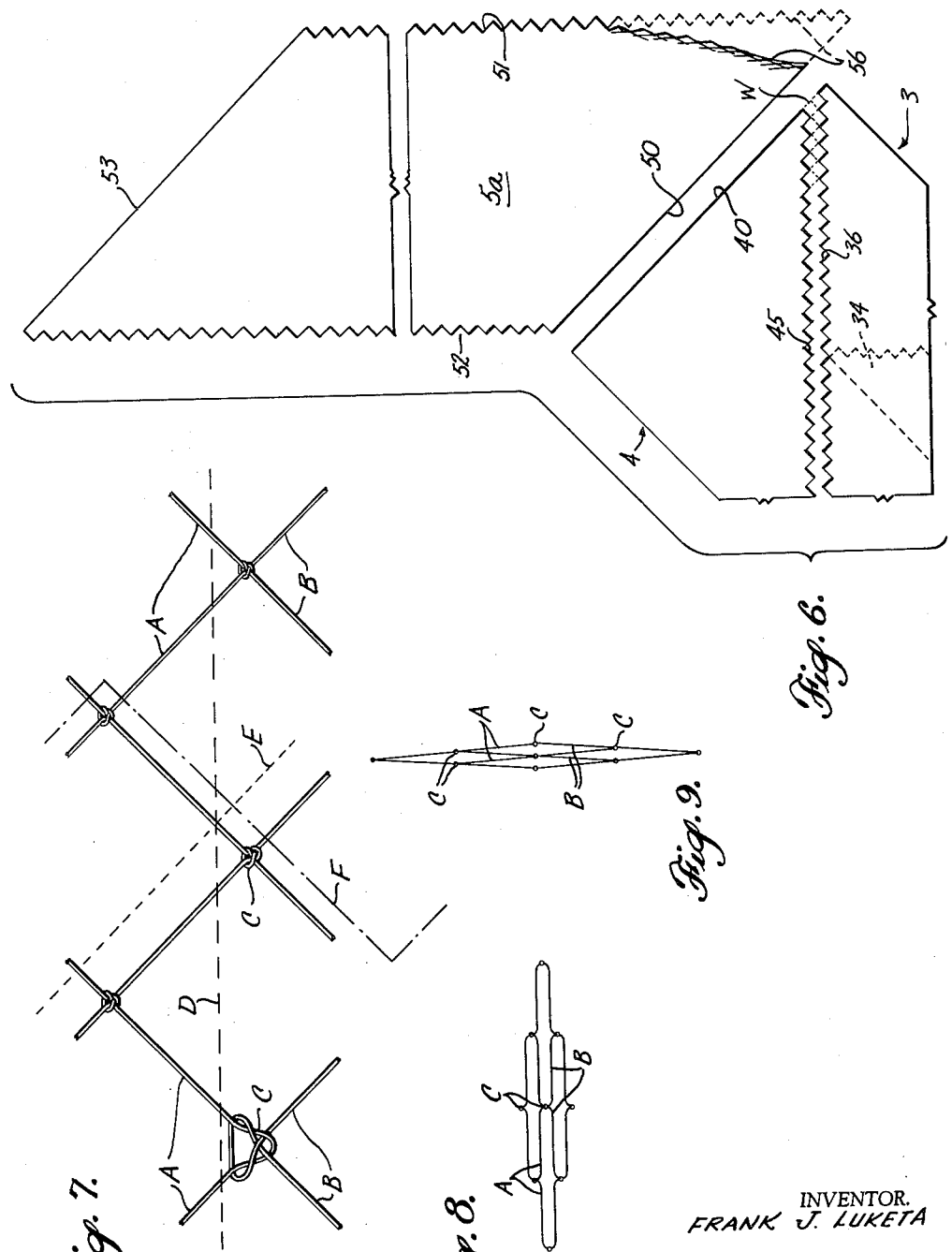

3,035,366
TRAWL NET PANEL ASSEMBLY
Frank J. Luketa, 5567 Greenwood, Seattle, Wash.
Filed Aug. 17, 1959, Ser. No. 834,031
27 Claims. (Cl. 43—9)

This invention concerns the assembly, from a plurality of panels, of a trawl net of a design such as, and capable of attaining the advantages inherent in, that disclosed in a companion application entitled Trawl Net Especially for Bottom Fishing, Serial No. 834,030, filed August 17, 1959.

That net includes generally upright curtains which are joined at their after ends to and in use diverge forwardly from a net body open only at its forward end, each curtain being unstressed, and hanging from a buoyed-up curtain line, and their lower edge being unrestrained, although weighted. Such curtains replace the forwardly divergent wings of standard trawl nets, which are formed of upper and lower wing panels integral with the corresponding body panels of the nets, and which are laced together along a longitudinal seam that extends aft to join also the same body panels. Wings of the so-called standard type, heretofore used, are secured along their upper and lower edges to upper and lower sweep lines, respectively, whereby the net is dragged forwardly. The attached wings are subjected to considerable tension, as they transmit the pull from the upper and lower sweep lines to the body, including the codend. The twine size and orientation of the mesh throughout the wings must be such as will support the stress to which these wings are subjected when subjected to drag forces in the straight-twine direction of stress, as that term is understood by those skilled in this art, which results in the meshes becoming elongated diamonds under stress, and being largely closed and oriented somewhat transversely to the direction of advance, they produce much drag. Moreover, such stress and mesh deformation tends to flatten the net, and hence reduces its height above the bottom, thereby lessening its frontal area and its ability to sweep in fish, and increasing the possibility that fish may escape over the net. All these factors very appreciably reduce the efficiency of the gear.

In contrast, the net of the companion application, identified above, with its curtain and sweep lines connected quite directly to the body of the net and its distended but unstressed and unrestrained curtains, creates but minimum distortion of the meshes, and leaves the meshes of the curtains wide open. Only the netting of the body of the net, namely, the elongated annulus of netting constituted primarily by the codend, the funnel in part and to some extent the overhang, need be cut and oriented to resist the stress of dragging. The curtains can extend more widely, and are of maximum height, and so sweep a larger area, a greater volume, and with less drag, than a standard net.

The present invention concerns the cutting of commercially available woven netting to form a net body and cooperating curtains of indeterminate length, in a simple manner, and assembling the net from a plurality of individual panels in each of which the meshes are best oriented, and of such twine size, to resist stresses to which they are subjected, while at the same time using twine sizes in different panels that are only so large as the stress requires or the absence whereof permits, thereby avoiding unnecessary deformation of the meshes and the creation of unnecessary drag as the net is pulled through the water.

Moreover, although the net of the companion application has a minimum of area (as compared to standard trawl nets) actually in contact with and dragging the bottom, and so liable to snag damage, some such damage is unavoidable at times. The present invention aims to minimize the extent of such damage within individual panels and within the net as a whole, and to facilitate its repair, by so cutting and assembling the netting in the areas most likely to be damaged that a snag is unlikely to run indefinitely through the netting, but will be localized, and by forming the net of a plurality of panels, each of appropriate twine size, so cut and so laced together along adjoining edges, that the removal, duplication if need be, and replacement of a damaged panel is readily and quickly accomplished. Also, each panel of which the net is composed is cut from standard heights and lengths of commercial netting, by straight cuts which are primarily bar cuts or point cuts, and so are easily made, rather than by more complex tapered cuts; tapered cuts are normally wholly eliminated. Nevertheless, the meshes in stressed panels are properly oriented to be deformed in the straight-twine direction, when stressed as intended, so as best to resist such stresses.

While the above outlines certain objects and advantages of this invention, others will appear as this specification progresses, and the invention will only be fully understood by careful study of this specification. The novel features of the invention will be set forth in the claims.

A net of chosen size has been shown for the purpose of illustrating the principles of this invention, and these principles can be incorporated in nets of different size, and the specific form may be otherwise varied, as will be explained later, without departure from the underlying principles.

FIGURE 1 is an isometric view of the several separated components of a trawl net (each individually completed) in accordance with this invention, and FIGURE 2 is a similar view showing the assembled net in position of use, and includes a door and certain lines. No attempt is made in these two figures to show the orientation of the mesh squares, which is of great importance in this invention, nor to include all the various lines, doors, floats, weights, etc.

FIGURE 3 is a flattened-out view of most of the netting panels of the several kinds required in such a net, shown individually but so far as possible in proper juxtaposition, and illustrating the types of cuts required or appropriate at the various edges. No attempt is made to differentiate between panels as to twine or mesh size.

FIGURE 4 is a detail of two differently cut and juxtaposed panel edges that are to be laced together, illustrating the disparity between their unstretched lengths, and FIGURE 5 is a similar detail of the two edges when laced together, showing how the shorter length of the one is made to match the greater length of the other.

FIGURE 6 is a view similar to and supplementing FIGURE 3, showing a curtain panel in correct juxtaposition relative to the overhang to which it is to be laced, and to the funnel.

FIGURE 7 is a detail of netting mesh, for the purpose of demonstrating the different types of cut.

FIGURE 8 is a diagram illustrating the effect of improperly stressing the mesh, and FIGURE 9 illustrates the correct manner of stressing it.

It will be helpful at the outset to explain the terms "bar cut," "point cut" (sometimes also called "square cut"), and "tapered cut," by reference either to page 4 to 7 of Fisheries Leaflet 394 (September, 1951) of the Fish and Wildlife Service, or to FIGURES 7, 8 and 9 hereof. Nets are woven by hand or by machine, in various heights (height connoting the dimension which is upright in use, but measured when the netting is relaxed) and lengths, although there is a practical limit to their height, and usually with double selvage edges at top and bottom, and panels are cut therefrom to fit the user's requirements. For example, twines A and B are interwoven by knots or hitches (one of which is shown loose, in FIGURE 7) in complemental loops or half-meshes to form meshes which are square when the net is unstressed. If a cut be made along the line D, the twine B is uncut, but the twine A is severed at each side of a knot, leaving two legs of twine B joined at the knot to the cut ends of A, and constituting a point. This is termed a "point cut," and is made quite simply, along a straight line. A cut along the line E severs each successive twine, and each knot joins three legs and one cut end; this is a "bar cut." It, too, is a simple straight-line type of cut. A combination of point cuts and bar cuts is termed a "tapered cut"; the line F represents one of many possible tapered cuts, this one having one point-one bar, and another could have a different number of points and/or bars. A tapered cut requires great care, both in planning and in execution.

When netting is tensioned, other than along a bar, the squares of the meshes are deformed and become elongated diamonds, and the net as a whole is stretched in the direction of the tension, and narrowed transversely thereto. The meshes are thereby closed. If the tension be perpendicular to the selvage edge, which runs the length of the netting strip at the top and bottom edge, the individual legs approach one another and bunch together; the stretch forms a running straight twine, as that term is defined in the Fisheries Leaflet mentioned, the knots are tightened, and the mesh has maximum strength. Thus if the mesh of FIGURE 7 be stretched vertically (or cross strip) as shown, maximum strength is attained, because of the straight-twine pull that results. FIGURE 9 represents this condition. If it be stretched in the horizontal direction (cross-twine or lengthwise of the strip of netting as it comes from the factory), the individual twines tend to straighten, but a cross-the-knot strain develops, which has a cutting action on the twine, giving the netting minimum strength, and tending to deform the mesh. FIGURE 8 represents this condition. It is important in any trawl net, including the present one (other than in the two types of curtains) that cutting of netting should be planned and executed so that any stress is resisted with a straight twine pull and not with a cross-twine pull. Since the curtains in this invention bear very little stress, their panels are made of strips of netting as it comes from the comparatively narrow factory weaving machines and need not be cut in short pieces and tiered as must be done when stress is a consideration. Thus a great saving in fabrication and maintenance time is attained in the curtains which form two-thirds or more of the area of this net.

Instances will appear hereinafter where a bar cut and a point cut, apparently of great disparity in length, are laced together and match correctly in length. This is done by stretching the mesh along the line of the point cut to match the length of the bar cut, having initially determined the correct number of points and the length when stretched of the so-stretched meshes.

Simplification of the assembly of the net, so that it can be repaired or replaced with minimum effort and delay, by substitution of a replacement panel properly cut, is highly important at times when the trawler is in the vicinity of a school of fish, and every minute's delay is costly. Accordingly, the net as a whole is composed of panels cut from commercially available netting, each cut as simply as possible, having regard to any stresses to which it may be subjected and the correct orientation of the mesh to resist such stresses. The several panels are woven together along adjoining edges, or where disconnection is expected are laced together, so that any damaged panel can be unlaced and replaced by a substitute panel, cut in simple manner from a netting supply, or carried precut.

Referring to FIGURES 1 and 2, the net chosen for illustration, and not to be taken as restrictive, includes from the after end forwardly a codend 1 closed during trawling at 10, merging into the intermediate section 11, to the open forward end whereof is laced a flaring throat 2. These elements conjointly define an elongated annulus of netting. Ahead of the throat is laced the funnel 3, the forward upper edge or bosom whereof is completed by the overhang 4. The overhang 4 and panel 33 may be integral, or separate and woven together, as shown. The woven interconnection is indicated by the dotted lines at W, in FIGURE 3.

Curtain lines 7 and sweep lines 8 are anchored adjacent the upper and lower edges, respectively, of a door 9 (see FIGURE 2) which is drawn forwardly in upright attitude by a tow line 90 from the trawler. Each curtain line 7 is attached directly to the body of the net, at points 49a and 49b, later referred to, located in the upper part of the net's open forward end. A float line 70 joins them across the upper bosom. Each sweep line 8 is attached directly to the body of the net, at points 39a and 39b, also referred to later. The drag of the net thus is concentrated wholly at these four points of attachment, and the mesh in the net body is oriented to transmit the tension. The curtain line is buoyed up by floats (not shown other than in the companion application) distributed throughout its length, while the sweep line is sufficiently heavy to drag the bottom. Such details are not part of but merely ancillary to the present invention, other than those which pertain to the manner in which the mesh is oriented and stressed.

Curtains 5a and 5b are suspended by their upper edge from the curtain lines 7, but their lower edges are free, and unrestrained. The curtains are of a height (as that term is hereinbefore defined) to sweep the bottom with their weighted lower edge, even though they incline rearwardly and downwardly when drawn through the water. The weights along their lower edge drag the bottom, but the net edges usually do not contact the bottom, but remain close to it. As the curtain lines diverge forwardly, due to water reaction upon the doors 9, the curtains hung from the curtain lines likewise diverge. They may be of any desired lateral length, and this is a unique advantage of this invention, for they are unstressed, and their mesh remains open and creates the very minimum of drag, and so permits the use of longer curtains with no increase in power. The ability to spread widely, to use long curtains, and to work with minimum drag greatly promotes efficiency. Their twine size may be small, and their mesh size may be large, each contributing to the lessening of drag. The body of the net is stressed longitudinally from the points 49a 49b, 39a and 39b, although the funnel, and especially the overhang, is stressed somewhat transversely by the spreading of the lines 7, 8, but the curtains 5a and 5b are unstressed, for they are disposed wholly ahead of the points of attachment of the several lines. Bonus curtains 6 are suspended, like the main curtains, from the curtain line 7 or from a separate forward extension thereof adjacent the door 9. Their function is to close any gap between the door and the forward end of the main curtain, for due to procedure in hauling in, it is impractical for the main curtains to extend all the way to the doors, and they stop some twenty feet behind the doors. The bonus curtains 6, disposed at a somewhat steeper slope than the main curtains, although weighted so they will sweep the bottom, prevent escape of fish, guided by the doors, around the forward end of the main curtains.

FIGURES 3, 4, 5 and 6 illustrate the layout of the individual panels (with the exception of bonus curtains) of which the net is assembled, in relation to the meshes of the netting. It is to such matters that the present invention is directed. FIGURE 3 shows at left the top panels, with the position of the lower funnel panel dotted in its assembled relation to the top funnel panel, and shows at right the corresponding lower panels and a portion of a curtain, but somewhat disoriented relative to the overhang to which it joins, and FIGURE 6 shows the curtain in correct orientation to the overhang and a portion of the funnel panels.

The codend 1 is greatly stressed in the direction of drag. Its twine size is large, and it is assembled by lacing together the equal length side edges at opposite seams 12 (FIGURES 1 and 2) the like rectangular top and bottom panels 13 and 14, each cut at each of its four edges with a point cut so that the straight-twine pull lengthwise bunches the twines close together for mutual strength. This construction and arrangement is common in the formation of codends and intermediates. The after end 10 is tied shut during trawling with a codline and the rear edge will be a double selvage edge, for strength.

Next ahead of the codend 1 and intermediate 11 is the throat 2. Its lower and upper panels 23, 24, with the panels immediately ahead of them, transmit the drag from the curtain lines and sweep lines to the body of the net, and the cutting pattern and mesh orientation of these throat panels must be considered in conjunction with those of the respective forward panels, namely the upper and lower funnel panels 33 and 34, and the overhang panel 4. FIGURE 3 shows that the panels 23, 33, and 4 define conjointly and approximately a diamond, except that the overhang panel 4 has a forward reentrant corner.

To obtain this diamond shape, the outer edges 25 and 25a of the throat panels 23, 24, are bar cut, and their after and forward edges 26, 27 are point cut, to match respectively the forward edge of the intermediate 11, and the after edge of the funnel panels 33, 34. Also, the side edges 30 of the top funnel panel 33 are bar cut, to carry the diamond shape well outwardly, but the side edges 30a of the lower funnel panel 34 are point cut, making them apparently considerably shorter than the edges 30 which they must match. The side edges 40 of the overhang panel 4 are bar cut at 90° to the edges 30, and except for the reentrant corner would meet at a point, to complete the diamond. Instead, edges 47a and 47b are bar cut inwardly and rearwardly until they meet a transverse bosom cut 48, which is a point cut. Since the net has a lower bosom that trails the upper bosom 48, the lower funnel panel 34 has two bar cut, inwardly and rearwardly converging edges 37a, 37b, joined by a transverse bosom 38 which is point cut.

The throat is completed by lacing together the equal length bar cuts 25, 25a along side seams 22. Its after point cut edge 26 is woven to the matching point cut forward edge of the intermediate 11. The funnel is completed by lacing together the bar cut edges 30 and the point cut edges 30a, along side seams 32. The apparent disparity in their length is compensated by stretching and deforming the mesh of the panel 34, thus lengthening its edge 30a and stressing this panel longitudinally. The highly stressed panel 34, of heavy twine, transmits the pull of the sweep lines through the groundline which is laced or hung to the edges 37a, 38 and 37b, to the codend of the net. Tension along bar cut edges 37a and 37b, but relieved across the point cut edge 38, distorts the adjacent mesh in prolongation of the curtain and ground lines 7 and 8 respectively, but not elsewhere, progressively throughout, in a way that gives very great strength to this concentrated stress-bearing area. The smaller twine size and looser mesh in the upper panel 33, which is more opposed to the water, creates less drag, and it tends to remain distended to full width and height. Only the smaller panel 34 engages the bottom.

The overhang panel 4 is woven along its after point cut edge 45 to the forward point cut edge 36 of the panel 33, so that in operating effect they become one panel, and the float line 70 is laced to the point cut bosom 48, and to the bar cut edges 47a and 47b, and the curtain lines, attached at 49a and 49b, produce tensioning in the angle behind the points 49a and 49b. If the panel 4 were to be considered as integral with the panel 33 (although this is economically impractical except as they are handwoven together) the diamond shape of the upper panel structure, including panel 23, becomes more apparent. Tension along lines 47a, 47b, and 40 distorts the mesh throughout, and affords resistance in adequate degree.

It can be seen that the curtain lines and the sweep lines join the net not through stressed wings, but directly at points 49a, 49b, 39a and 39b in the body of the net where the meshes are arranged to be deformed in a manner best calculated to resist such stresses, yet without so distorting the net as a whole as to lessen its spread laterally or vertically, or to create unnecessary drag. Even this can be controlled to some extent by slacking back the curtain lines, to get more open meshes and greater vertical height, or vice versa. The triangular sides of the panel 33, wherein that panel exceeds the panel 34 in width when laid flat (see FIGURE 3), afford ample height, so that the net is always of the height of the doors, and the bar cut edges 40 trend downwardly and rearwardly when assembled, from the forward points 49a, 49b to the points 39a, 39b.

The curtains 5a, 5b, since they are not stressed by the drag of the net, can be made of light twine, and if desired of large mesh size. Also, the horizontal edges 51 and 52 of the curtains may be the finished (selvage) edge of commercial netting, or the edges can be point cut. Reference to the edges as point cut is intended to include the equivalent finished or selvage edge. The ends 50 and 53 are bar cut. The curtains can be cut to any length desired, dependent mainly upon the power available and door size, for the longer the curtains and the wider they spread, the greater frontal area can the net sweep. The ability to use a strip of web as it comes from the factory, in a curtain of indefinite length, is an advantage unique in a net made according to this invention.

Since the curtains are unstressed, and spread at a wide angle to the direction of advance (45° is the ideal angle of divergence from the direction of drag), merely trailing downwardly and rearwardly, their mesh remains wide open, and produces very little water drag. Their small twine size and large mesh size minimizes water drag. Each curtain should be of greater height than the side of the net body to which it is laced, for it must incline rearwardly and downwardly to sweep close to the bottom with its lower edge 51. The extra height is represented in FIGURE 6 at the triangle 56. The bar cut edges 40 of the overhang and 50 of the curtains are laced together at 55, and the triangle 56 is gathered in at the bottom. It thereby reinforces the lower edge of the curtain adjacent the point of connection of the sweep line to the body of the net, and it avoids a bagging where the curtain's trailing lower edge is drawn forwardly to join the net body.

The orientation of the meshes in the curtains and the omission, preferably, of a selvage edge, are designed to minimize the extent of any snag damage that might occur. With a selvage edge reinforcing the lower edge of a curtain, any snagging would be resisted by the selvage edge. This, being joined to each successive mesh longitudinally, would tear all along the edge until the selvage broke or became disengaged. The damage would be extensive. With no selvage edge, but merely light twine in points, a snag would engage one or a few meshes, tear out in a localized area, and would not run. A tear will not run across points, unless a stronger, point-attached selvage is present, nor will a tear run the length of bars. The result, then, of eliminating a lower selvage from the point cut lower edge of the curtains, is to minimize and localize snag damage.

Bonus curtains 6, referred to in some detail in the companion application, are smaller duplicates of the main curtains 5a, 5b, and are similarly cut. They cover the gap of some twenty feet between the water reaction doors and the forward edge of main curtains 5a, 5b.

The diamond shape of the related panels 23, 33, and 4 (almost all outer edges whereof are bar cut), and the relationship thereto of panels 24, 34, facilitates selection of the height of a net to fit particular circumstances. If it is to be of lesser height, as for shrimp fishing in the Gulf of Mexico, the points 49a, 49b are located, along a line bisecting their angles, closer to the edge 45. The edges corresponding to 40 and to 47a and 47b are accordingly relocated, and bar cut as before. This reduces the length of edge 45, and the length of edge 36 must be correspondingly shortened. The points 39a and 39b of panel 34, which if the panels were oriented as suggested by the dash line showing in FIGURE 3 would lie in the same bisecting lines, are relocated along the same lines by a like distance, and the bar cuts 37a, 37b are made. The point cut edges 30 and 40 remain as before. The length of edge 35 remains unchanged, but the distance between edges 35 and 36 is reduced to correspond to the length of edges 30a, which reduces the length of bar cut edges 30 by the correct amount. Thus any size net opening can be made, with assurance that it will stay open, that its mesh will be correctly oriented, and that its panels will fit together properly.

In use the lower bosom 38 is buoyed up or otherwise supported somewhat above the bottom, although barrier chains drag therefrom to keep it close to the bottom and to prevent escape of fish below it. The panels 14, 24, and to some extent 34, drag over the bottom. They can be protected by chafing gear, but in any event their twine size, mesh size, and the orientation of their meshes to produce straight twine pull (FIGURE 9) affords them long life and great strength. The lower edges 51 of the curtains do not drag the bottom, since the planing weights (shown at 11 in Serial No. 834,030) are intermediate them and the bottom, and these are preceded by the sweep lines, and are thus somewhat protected from snag damage. Furthermore, the lower edge of the curtains being unstressed and rather loose tends to yield upwardly and pass over as the upwardly and forwardly slanting curtains encounter a snag as the curtains sweep the bottom.

Doors 9 employed ahead of each curtain are designed to veer outwardly and to hold the net spread widely. The float line 70, attached to the edges of the net 47b, 48 and 47a is shackled to curtain lines 7 at 49a and 49b, which curtain lines are in turn attached adjacent the upper edge of the doors. The sweep line, attached only to the net at points 39a and 39b, and connected to ground line that extends across edges 37b, 38 and 37a is attached adjacent the lower edge of the door. The action of the water on the tensioned wings in a standard net, and the crowding of their meshes more closely together in the vertical direction by the tension, flattens the net body and reduces its height above the bottom, and so reduces the volume swept by the net, and allows fish to escape over the net as well as under the tensioned ground line. The avoidance of tension in the curtains of this net precludes such reduction of its height above bottom, and the curtain line remains parallel to the bottom. This is a material factor in improving the efficiency of the net. It is more efficient, and therefore preferable, normally, to have the curtain lines and float line trail back in use, parallel to the bottom at a height above bottom governed by the door height. However, when desirable, in special cases in certain fisheries a greater average height above bottom can be attained for a given door height by tapering the upper curtain cut upwardly and therefore progressively higher as it leads away from its door end (the overhang and the funnel being cut correspondingly higher also). Many more planing floats would, of course, be required to maintain the curtain lines and float line in this inclined attitude against the water drag, especially if the curtains were very long.

Should any panel be damaged, that panel is merely unlaced, and a substitute panel will replace it. Such substitute panels can be precut, or cut as needed. In the latter case all cuts are straight bar cuts or point cuts, quickly, easily, and accurately made, so that the replacement of a damaged panel is a simple, rapid job. Moreover, damage is localized in a given panel. There is no need, as in repair of standard trawl nets, to disassemble in large measure the entire net, and to repair the damage before reassembling it. Such procedure is highly wasteful of labor, fishing time, and money, and the ability to keep a net in active operation over long periods is of great importance, and is achieved by the panelized construction and by the mesh orientation. The ability to cover a greater area and volume in a given time, yet with the same or even less expenditure of power, is also a highly important consideration, and is achieved by correct orientation of meshes in the several panels, and the use of minimum twine size and maximum mesh openings wherever possible.

Where reference is made herein, including the claims, to lacing for the joining of two panels, that term should be understood in the general sense, to include any convenient, reasonably rapid procedure for joining them. Junctions referred to as woven could be laced, although weaving is preferred at these seams.

I claim as my invention:

1. A trawl net body comprising an elongated annulus of netting open at its forward edge, top and bottom panels of netting the mesh squares whereof are oriented diagonally to the direction of drag, said top and bottom panels being joined to the forward edge of the annulus and extending ahead of the latter, each of said panels having rear edges which in part at least are bar-cut divergently outwardly and forwardly, and of equivalent over-all lengths and interconnected throughout such lengths, the upper panel being also bar cut along forward edges which converge forwardly and inwardly from the points of greatest width of said upper panel to laterally spaced forward termini, a first line for dragging the net body secured to the same at each such forward terminus, and a second line secured to the net body at the points of greatest width of the upper panel, constituting opposite rearward termini.

2. A trawl net including an elongated annulus of netting open at its forward end, a top netting panel joined along the top forward edge of the annulus and a bottom netting panel joined along the bottom forward edge of the annulus, the top panel being of generally diamond shape, with bar-cut forward and rear side edges, respectively, and meshes oriented diagonally to the length of the annulus, and the bottom panel being of generally square shape with its meshes oriented correspondingly to those of the top panel, but with point-cut side edges directed forwardly and rearwardly and of a length equivalent to the length of the forwardly diverging rear side edges of the top panel, such edges being joined throughout their length and defining lower points of attachment at the forward ends of such joints, the top and bottom panels being each formed with a reentrant forward corner defining an indentation at the forward central portion along bar-cut rearwardly converging edges, the indentation of the bottom panel beginning at the said points of attachment, and the junction of the bar-cut forward side edges of the upper panel and its indentation defining upper points of attachment, and upper and lower lines secured at the several such points of attachment and extending divergently forwardly, for dragging the net.

3. A trawl net as defined in claim 2, wherein the indentations of the top and bottom panels are of substantially identical size and shape, when such panels are free from distorting stress.

4. A trawl net as defined in claim 2, including two curtains point-cut along their horizontal edges and bar-cut along their rear edge at least, each such rear edge being of a length somewhat exceeding the length of the bar-cut forwardly converging forward side edges of the top panel, and joined thereto intermediate the upper and lower points of attachment at the respectively opposite sides, the excess length of each curtain's rear edge being gathered adjacent the lower point of attachment, and said curtains being hung by their point-cut upper edges from the lines secured to the upper points of attachment, and hanging free along their lower edges.

5. A trawl net as in claim 1, wherein the opposite rear edges of the bottom panel ahead of a bar-cut portion, are point-cut, and the rearwardly converging edges of the top panel each are of a length corresponding to and joined to the stretched-out point-cut edge at the same side of the bottom panel.

6. A trawl net as in claim 1, and curtains engaged along their upper edges only with the first lines, their lower edges depending to the bottom, and the curtains being free from stress throughout their length, and joined to the convergent forward edges of the top panel along the rear edges of the curtain.

7. A trawl net as in claim 1, wherein the rear side edges of the upper panel, to the rear of the point of widest extent, are bar cut convergently towards the juncture of the upper panel to the annulus, and curtains suspended along their upper edges only to the first lines at the opposite sides of the top panel, their lower edges depending to the bottom, said curtains being point-cut along their upper and lower edges, and bar-cut along their rear edges, and joined along such rear edges to the convergent bar-cut rear side edges of the top panel.

8. A trawl net as in claim 7, wherein the curtains are also bar-cut along their forward edges, parallel to their bar-cut rear edges.

9. A trawl net including a closed elongated net body open at its forward end, and upright curtains of netting secured to and extending divergently forwardly in use from the opposite side edges of the net body at its open forward end, lines for dragging the net through the water attached to the net body at a point in the vicinity of the point of connection of the rear end of the upper edge of each curtain with the net body, and extending forwardly spaced above the bottom, the netting mesh in the net body, especially immediately to the rear of each such point of attachment, being oriented to elongate in the straight-twine direction of stress and to narrow down transversely of such direction, and so to transmit strongly the drag to the mesh rearwardly thereof, each curtain being suspended by its upper edge from the corresponding line, and hanging free at its lower edge, and the netting mesh in each curtain being oriented to remain open and to transmit no appreciable drag to the net body.

10. A trawl net as in claim 9, including additional lines for dragging the net body attached to the net body at a point in the vicinity of the point of connection of the rear end of the lower edge of each curtain with the net body, and extending divergently forwardly along the bottom, the netting mesh of the net body, especially immediately to the rear of each such point of attachment, being oriented to elongate in the straight-twine direction of stress and to narrow down transversely of such direction, and so to transmit strongly the drag to the mesh rearwardly thereof, each curtain being substantially free of connection to said bottom-contacting lines.

11. A trawl net as in claim 9, wherein the curtains are point-cut along their horizontal edges.

12. A trawl net comprising a codend of mesh closed at its after end during use, and open at its forward end; an upper mesh panel generally of diamond shape, oriented with its mesh squares generally diagonally to the direction of the force required to drag the codend, said upper panel being disposed ahead of the upper portion of the codend, and having a transverse edge across its rear corner of a length corresponding to a part of the circumference of the open end of the codend, and joined thereto, said upper panel also having bar cut side edges diverging forwardly from the termini of its rear edge, and a reentrant forward corner; a lower mesh panel of a shape approximately corresponding to the shape of the upper panel, including a transverse rear edge of a length corresponding to the remainder of the circumference of the open end of the codend and joined thereto, and a reentrant forward corner, but its side edges being, in part at least, point cut, and each of a total length, when the point cut edge is extended, matching the length of the divergent bar cut side edges of the upper panel, and joined thereto.

13. A trawl net as in claim 12, wherein the mesh squares of the codend are oriented diagonally to the direction of the dragging force, and the forward edges of the codend mesh are point cut, and wherein the transverse rear edge of the upper and the lower mesh panels are also point cut, and are joined to the matching point cut forward edges of the codend.

14. A trawl net as in claim 12, wherein the upper panel is formed with forwardly convergent bar cut edges extending from the termini of its forwardly divergent side edges to the termini of its reentrant forward corner.

15. A trawl net as in claim 14, including a curtain panel extending forwardly at each side of the net, and each having a bar cut rear edge of a length approximating the length of the forwardly convergent bar cut side edges of the upper panel, and joined thereto.

16. A trawl net as in claim 15 wherein the bar cut rear edge of each curtain somewhat exceeds the length of the bar cut side edge of the net to which it is joined, the excess height of the curtain so formed being gathered up and joined to the lower end of the side edge of the upper panel.

17. A trawl net as in claim 12, wherein the reentrant forward corner of the upper panel has a point cut transverse central edge portion and bar cut terminal edge portions extending divergently outwardly to the side edge of said upper panel.

18. A trawl net as in claim 12, wherein the length of the lower panel in the direction of drag is shorter than the length, in the same direction, of the upper panel.

19. A trawl net as in claim 18, wherein the side edges of the lower panel are bar cut and diverge forwardly from the termini of said panel's rear edge, and at a point forward thereof extend directly forward and are point cut, said lower panel being formed of a forward and a rearward subpanel each having an edge directed transversely from the termini of the bar cut side edge portions, and joined along such edges.

20. A trawl net as in claim 12, wherein the upper panel includes a forward and a rearward subpanel, the forward edge of the rear subpanel and the rearward edge of the forward subpanel extending transversely of the panel from corner to corner, and each being point cut, said point cut transverse edges being joined together.

21. A trawl net as in claim 7, wherein the curtains are also bar-cut along their forward edges.

22. A trawl net body comprising an elongated annulus of netting open at its forward edge, top and bottom panels of netting the mesh squares whereof are oriented diagonally to the direction of drag, said top and bottom panels being joined to the forward edge of the annulus and extending ahead of the latter, each of said panels having rear edges which in part at least are bar-cut divergently outwardly and forwardly, and of equivalent over-all lengths and joined one to the other throughout their length, each of said panels also being bar-cut along forward edges which converge rearwardly and inwardly, the upper panel being also bar-cut along forward edges which diverge outwardly and rearwardly from the outer termini of its inwardly converging forward edges to a junction with the outer termini of its rear edges, a first line for dragging the net body secured to the same at each junction of the inwardly converging and outwardly diverging forward edges of the upper panel, and a second line secured at the junction, at each side, of the forward and rearward edges of the upper panel.

23. A trawl net comprising a codend of mesh closed at its after end during use, and open at its forward end; an upper mesh panel generally of modified diamond shape disposed ahead of the upper portion of the codend, said upper panel having an edge across its rear corner which is point cut, and bar cut side edges, said rear edge being joined to the upper forward edge portion of the codend, and said upper panel also having a transversely directed forward edge across its forward corner, the bar cut side edges diverging forwardly from the opposite ends of the point cut rear edge; a lower mesh panel having a point cut rear edge joined to the lower forward edge portion of the codend, and side edges which are shorter than the side edges of the upper panel, and which are in part bar cut and diverge forwardly from the point cut rear edge, and are joined to the divergent bar cut side edges of the upper panel, and which in part are point cut and of a length when extended to correspond to, and which are joined to, the bar cut side edges of the upper panel beyond the forward ends of the bar cut portions of the side edges of the lower panel, and the lower panel also having a transversely directed forward edge.

24. A trawl net as in claim 23, wherein the codend is formed of mesh panels of generally rectangular shape having all its edges point cut, the point cut forward edges of the codend panels matching and being joined to the point cut rear edges of the upper and lower panels defined in claim 23.

25. A trawl net formed of a plurality of netting panels, and including a codend the mesh squares whereof are oriented diagonally to the length of the codend, and which are point cut along the forward edge, an upper and a lower panel each disposed ahead of the codend, and each having its mesh squares similarly oriented, said upper and lower panels being joined by the points at their after edges to the points at the forward edge of the codend, to transmit tensional loads directly to the mesh of the codend, the upper panel having bar cut side edges diverging forwardly from the codend, and the lower panel having shorter bar cut side edges similarly diverging, and joined to the bar cut side edges of the upper panel, said lower panel also having point cut side edges directed forwardly from the ends of the shorter bar cut edges, each of a length which when extended corresponds to so much of the length of the divergent bar cut side edges of the upper panel as is in excess of the length of the shorter bar cut side edges of the lower panel, and joined to such excess length, and each of the upper and lower panels having a transverse forward edge for securement of a line along such edges.

26. A trawl net as in claim 25, wherein each of the upper and lower panels, at its forward edge, includes a central point cut portion and bar cut portions at each side diverging forwardly from the outer ends of the point cut portion, for securement of the line along the forward edge thus formed.

27. A trawl net formed of a plurality of netting panels, and including an annular after portion closed at its rear end during use, the mesh squares whereof are oriented diagonally to the direction of drag, and terminating at a forward point cut annular edge, an upper and a lower panel each having its mesh squares oriented similarly, and having a transverse after point cut edge matching and joined to the point cut forward annular edge of the after portion, said upper and lower panels each having bar cut side edges diverging forwardly from the ends of their point cut after edge, and joined together, one of the upper and lower panels having a divergent bar cut side edge of greater length than the corresponding edge of the other such panel, and the latter panel having forwardly directed point cut side edges of a length, when distended, to match the excess length of the bar cut side edges of the companion panel, and joined thereto to complete a funnel at its forward entrance, and the upper and lower panels each having a transverse forward edge for securement of a line, whereby to drag the net forwardly.

References Cited in the file of this patent
UNITED STATES PATENTS

| 844,925 | Elenterius | Feb. 19, 1907 |
| 2,816,386 | Harris et al. | Dec. 17, 1957 |

FOREIGN PATENTS

| 9,106 | Great Britain | 1912 |
| 339,083 | Great Britain | Dec. 4, 1930 |